US008515184B1

(12) United States Patent
Medasani et al.

(10) Patent No.: US 8,515,184 B1
(45) Date of Patent: Aug. 20, 2013

(54) SYSTEM FOR VISUAL OBJECT RECOGNITION USING HETEROGENEOUS CLASSIFIER CASCADES

(75) Inventors: Swarup Medasani, Thousand Oaks, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 849 days.

(21) Appl. No.: 12/462,017

(22) Filed: Jul. 28, 2009

(51) Int. Cl.
  *G06K 9/62* (2006.01)
(52) U.S. Cl.
  USPC ........... 382/224; 382/181; 382/190; 382/226; 382/227; 706/12; 706/15; 706/45; 706/46
(58) Field of Classification Search
  None
  See application file for complete search history.

(56) References Cited

U.S. PATENT DOCUMENTS

| | | | | |
|---|---|---|---|---|
| 5,020,411 | A * | 6/1991 | Rowan | 89/1.11 |
| 7,916,951 | B2 * | 3/2011 | Landwehr et al. | 382/224 |
| 8,165,407 | B1 * | 4/2012 | Khosla et al. | 382/224 |
| 2003/0072470 | A1 * | 4/2003 | Lee | 382/103 |
| 2004/0218827 | A1 * | 11/2004 | Cohen et al. | 382/243 |
| 2005/0013486 | A1 * | 1/2005 | Wiedemann et al. | 382/181 |
| 2005/0025357 | A1 * | 2/2005 | Landwehr et al. | 382/170 |
| 2005/0147303 | A1 * | 7/2005 | Zhou et al. | 382/190 |
| 2005/0196047 | A1 * | 9/2005 | Owechko et al. | 382/224 |
| 2006/0222221 | A1 * | 10/2006 | Sathyanarayana | 382/128 |
| 2007/0112701 | A1 * | 5/2007 | Chellapilla et al. | 706/15 |
| 2007/0223812 | A1 * | 9/2007 | Ito | 382/165 |
| 2008/0219555 | A1 * | 9/2008 | Wiedemann et al. | 382/181 |
| 2009/0125473 | A1 | 5/2009 | Amini et al. | |
| 2009/0161912 | A1 | 6/2009 | Yatom et al. | |

OTHER PUBLICATIONS

Bayik, "Automatic Target Recognition in Infrared Imagery", Sep. 2004, Thesis, Middle East Technical University, 1-62.*
Chen et al. "Fast human detection using a novel boosted cascading structure with meta stages", Aug. 2008, IEEE, Trans Image Process, 17(8), pp. 1452-1464.*
Kukenys et al. "Classifier cascades for support vector machines", Nov. 26-28, 2008, IEEE, pp. 1-6.*
Viola et al. "Robust Real-Time Face Detection", 2004, Int. J. Comput. Vision, 52 (2), pp. 137-154.*
Viola et al. "Detecting Pedestrians Using Patterns of Motion and Appearance", Aug. 2003, Mitsubishi Electric Research Laboratories, pp. 1-11.*
Kukenys, I. McCane, B. "Classifier cascades for support vector machines," Dept. of Comput. Sci., Univ. of Otago, Dunedin;This paper appears in: Image and Vision Computing New Zealand, 2008. IVCNZ 2008. 23rd International Conference, Publication Date: Nov. 26-28, 2008, On pp. 1-6.

(Continued)

*Primary Examiner* — Matthew Bella
*Assistant Examiner* — Jason Heidemann
(74) *Attorney, Agent, or Firm* — Tope-McKay & Associates (57) ABSTRACT

Described is a system for visual object recognition using heterogeneous classifier cascades. Visual object recognition is one of the most critical tasks for video and image analysis applications. The present invention utilizes a cascade of classifiers, wherein each stage is dedicated to a certain task such as achieving high accuracy or reducing false alarms. The stages are then appropriately trained using either the training data or false alarm datasets, respectively. Additionally, the features that are employed by the classifier cascades are heterogeneous and complementary in that several types of features may be used. The system described herein has multiple applications in a variety of fields including automotive safety, factory automation, surveillance, force protection, and automatic target recognition.

15 Claims, 7 Drawing Sheets

(56) References Cited

OTHER PUBLICATIONS

"Multiple Classifier Object Detection with Confidence Measures," Book Series, Lecture Notes in Computer Science, Publisher Springer Berlin / Heidelberg, book AI 2007: Advances in Artificial, pp. 559-568, Subject Collection Computer Science, SpringerLink Date Friday, Nov. 23, 2007.

P. Viola, M. Jones, "Rapid object detection using a boosted cascade of simple features ," Computer Vision and Pattern Recognition, 2001. CVPR 2001. Proceedings of the 2001 IEEE Computer Society Conference on, vol. 1 (2001), pp. I-511-I-518 vol. 1.

\* cited by examiner

SYSTEM FOR VISUAL OBJECT RECOGNITION USING HETEROGENEOUS CLASSIFIER CASCADES

BACKGROUND OF THE INVENTION (1) Field of Invention

The present invention relates to a system for visual object recognition and, more particularly, to a system for visual object recognition which utilizes heterogeneous classifier cascades.

(2) Description of Related Art

Visual object recognition is one of the most critical tasks for video and image analysis applications. Typical approaches to visual object recognition involve using a chain of classifiers to quickly reject most non-object regions with a minimum of computation, and process the more object-like regions with high accuracy using computationally expensive features. In addition, most existing approaches use homogeneous features consisting of the same feature type, such as Haar or Gabor wavelets. Related prior art utilizes classifier cascades built from a fixed set of features for detecting objects in images. All stages in the cascade are similar and trained using the same training data or sometimes a supplemental bootstrap dataset. Stages increase in complexity and accuracy as the data moves through the cascade. In current approaches, the stages in the cascade do not concentrate on specific tasks, such as maximizing the detection rate or minimizing the false alarm rate.

Thus, a continuing need exists for a system for visual object recognition that significantly improves the detection rate and reduces the false alarm rate by dedicating certain stages in a classifier cascade for specific tasks and also by using a heterogeneous and complementary collection of features for more robust stages.

SUMMARY OF THE INVENTION

The present invention relates to a system for visual object recognition comprising one or more processors that are operable for performing operations of analyzing an input image utilizing a cascade of heterogeneous classifiers. The cascade of heterogeneous classifiers comprises a plurality of specialized stages configured to perform specific tasks, such that each specialized stage in the cascade consists of a distinct classifier type. A set of heterogeneous and complementary features are extracted from an analysis window, wherein the analysis window is a subregion in the input image, and wherein each specialized stage extracts distinct sets of heterogeneous and complementary features. Finally, the present invention presents an object in the input image as the object is extracted from the input image.

In another aspect, the plurality of specialized stages is trained with a set of data specific to the task to be performed, wherein each specialized stage is trained separately with a distinct set of data in order to bias each specialized stage independently.

In another aspect, at least one of the plurality of specialized stages is trained to be biased toward an object-like region and reject a plurality of non-object-like regions in the input image.

In another aspect, at least one of the plurality of specialized stages is configured to mitigate false alarms, such that the specialized stage configured to mitigate false alarms is further trained using at least one instance of a known false alarm collected when at least one previous specialized stage in the cascade was run on an input image that contained only non-object-like regions.

In another aspect, at least one of the plurality of specialized stages is a k-nearest neighbor stage configured to further minimize residual false alarms that persist, wherein the k-nearest neighbor stage uses a set of stored feature information from at least one false alarm region to reject any residual false alarms.

As can be appreciated by one in the art, the present invention also comprises a method for causing a processor to perform the operations described herein.

Finally, the present invention also comprises a computer program product comprising computer-readable instruction means stored on a computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for visual object recognition and, more particularly, to a system for visual object recognition which utilizes heterogeneous classifier cascades. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for object recognition in visual systems. The system is typically in the form of a computer system, computer component, or computer network operating software or in the form of a "hard-coded" instruction set. This system may take a variety of forms with a variety of hardware devices and may include computer networks, handheld computing devices, such as cell phones and personal digital assistant (PDA), cellular networks, satellite networks, and other communication devices. As can be appreciated by one skilled in the art, this system may be incorporated into a wide variety of devices that provide different functionalities. The second principal aspect is a method for building heterogeneous classifier cascades for use in visual systems, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), random access memory, and flash-type memories. The computer program product may exist in the memory of a hand-held device such as a cell phone or personal digital assistant (PDA). The computer program product may be added to the cell phone or PDA by the manufacturer or user.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) Introduction

Visual object recognition is one of the most critical tasks for video and image analysis applications. Typical approaches involve computing a large set of image features and using a machine learning method for selecting the most useful features and building a classifier based on them. However, processing every region in the image with such a classifier is computationally expensive. An alternative approach that has typically been used is to use a chain of classifiers also called as "rejection chains" which in the early stages contain classifiers designed to quickly reject most non-object regions with a minimum of computation, and as the chain is descended, these "rejectors" progressively become more accurate and expensive. In general, existing classifier cascades are homogeneous in that all stages are constructed using similar types of features such as Haar or Viola wavelets, and all stages use the same input training data or additional bootstrap data to train and improve the classifier stages.

(3) Specific Details

The present invention improves upon the prior art by providing a system for visual object recognition which utilizes heterogeneous multi-stage classifier cascades. The present invention may be used to build classifier cascades for visual object recognition. Such a tool can be used to improve performance and add capabilities to a wide variety of vision systems, non-limiting examples of which include automotive and commercial vision systems. The invention described herein is applicable to broad areas of automotive safety, non-limiting examples of which include back-up warning and pre-crash sensing systems. Factory automation, force protection, and automatic target recognition are additional non-limiting examples of applications for the present invention.

Figure 1:
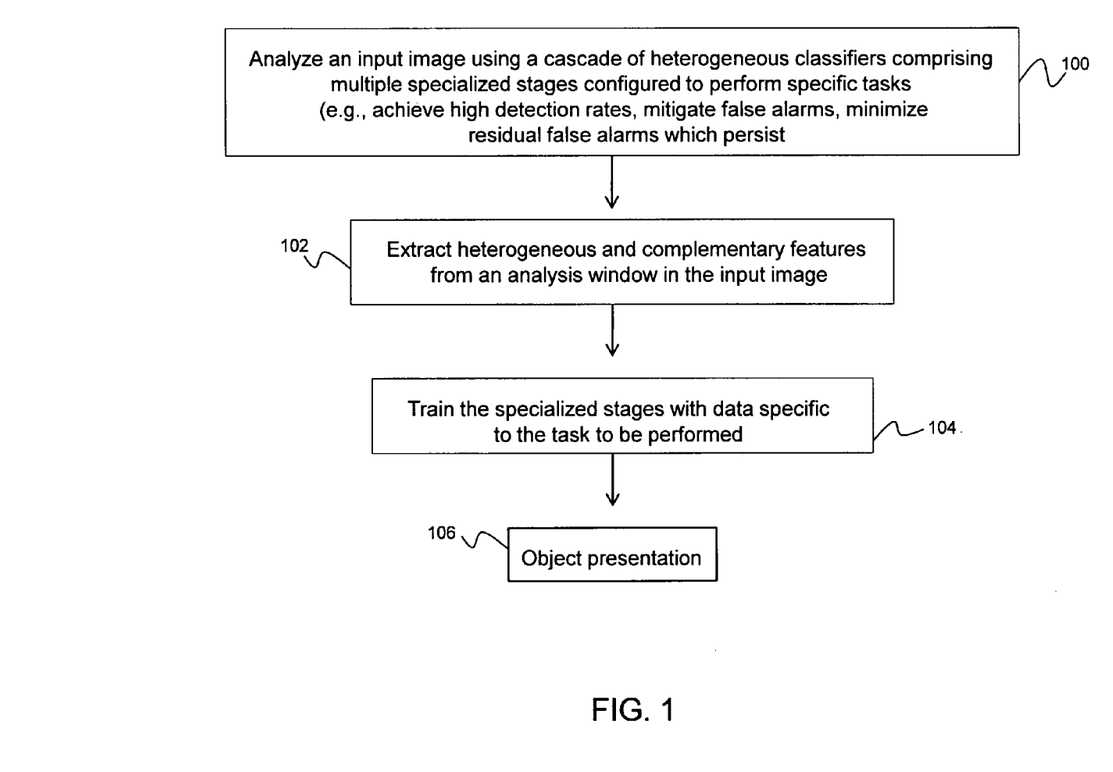
FIG. 1 is a flow diagram illustrating a system for visual object recognition according to the present invention.

A method for visual object recognition configured to perform the operations of the present invention is illustrated in FIG. 1. The method comprises acts of analyzing an input image utilizing a cascade of heterogeneous classifiers 100. The cascade of heterogeneous classifiers 100 can be considered heterogeneous since the stages in the classifier cascade are all different classifiers ranging from support vector machines to neural networks. Furthermore, the present invention utilizes a cascade of classifier stages, wherein each stage is dedicated to a certain task, such as achieving high accuracy or reducing false alarms. The stages are then appropriately trained using either the training data or false alarm datasets, respectively. Additionally, the features that are employed by the classifier cascades are heterogeneous in that different types of features may be used in different stages. As is described in more detail below, the features can be considered complementary features because the process begins with general Haar wavelet features that capture the general appearance of an object, followed by edge-symmetry features which capture the symmetry properties of the object, and so on. In effect, each of the stages using features that represent one attribute of the object. Non-limiting examples of the features include Haar or Viola wavelets that capture multi-scale edge information, edge symmetry features that capture edge information at multiple orientations, and histograms of oriented gradients that capture gradient information which is invariant to geometric and photometric transformations. The cascades use stages that are built from heterogeneous types of classifiers, non-limiting examples of which include neural networks, decision trees, support vector machines, and k-nearest neighbors.

The cascade of heterogeneous classifiers comprises multiple specialized stages configured to perform specific tasks, non-limiting examples of which include achieving high detection rates, mitigating false alarms, and minimizing residual false alarms which persist. Heterogeneous and complementary features (e.g., Haar or Viola wavelets, edge symmetry features) are then extracted from an analysis window in the input image 102. The features that are employed by the classifier cascades are heterogeneous and complementary in that several types of features may be used to capture image information.

The specialized stages are trained using data pertinent to the task that stage is concentrating on accomplishing 104. For example, a false alarm mitigation stage is trained using false alarm data, while a high accuracy stage is trained on the input training or bootstrap data. Bootstrap data is generated by collecting input data that was previously misclassified. Finally, an act of recognizing whether the input image contains an object occurs, wherein an object extracted from the input image is presented to a user 106. In a desired aspect of the present invention, the system described herein is utilized for human detection.

Figure 2:
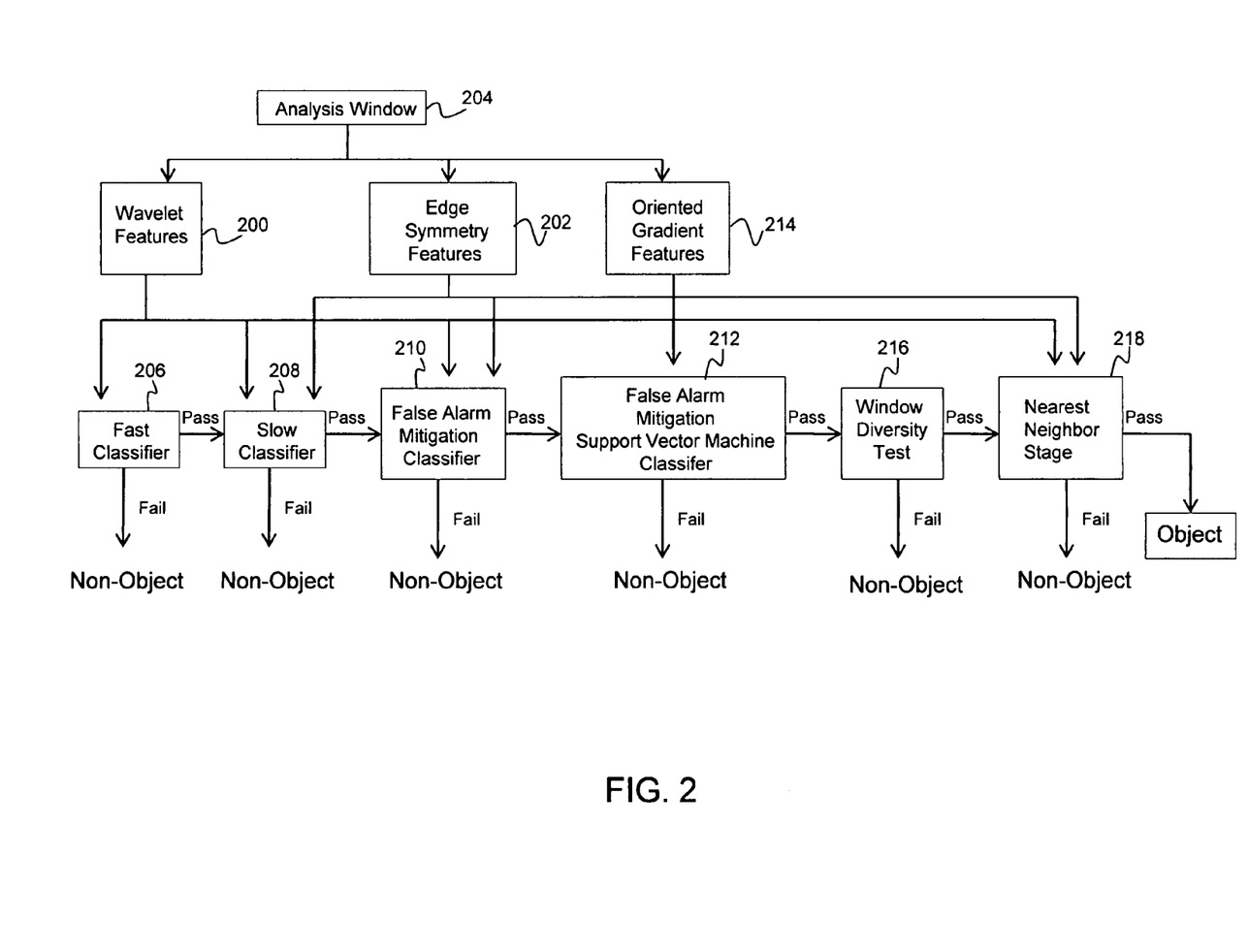
FIG. 2 is a flow diagram depicting a classifier cascade for human detection according to the present invention.

FIG. 2 illustrates a classifier cascade framework for detecting humans in images. Haar wavelet 200 and edge symmetry 202 features are first extracted from analysis windows 204 (which are subregions in the input image). Fast 206 and slow 208 neural network classifiers are trained that use only the Haar wavelets 200 and edge symmetry 202 features, respectively. The "fast" classifier 206 is faster to compute because it uses only Haar wavelets 200. For this example, the fast classifier 206 stage is trained to be biased towards human-like regions and rejects most of the other regions in the image. The slow classifier 208 processes only those regions that are very human-like with more features and filters. Since it is more complex and uses both Haar and edge symmetry features, it is slower to compute. A false alarm mitigation classifier stage 210 then attempts to reject any further non-human-like regions that may have filtered through.

The false alarm mitigation classifier stage 210 of the classifier is trained using the positive class data and instances of known false alarms that were collected when the cascade, with only the fast 206 and slow 208 stages, was run on imagery that did not contain humans. This training set is quite different from the training set used to train the fast 206 and slow 208 classifier stages.

A false alarm support vector machine stage 212 that utilizes linear models is trained on a histogram of oriented gradient features 214 for further minimizing any false alarms. Histograms of oriented gradient features 214 are feature descriptors used in computer vision and image processing for the purpose of object detection, wherein the occurrences of gradient orientation in localized portions of an image are counted. Histograms of oriented gradient features 214 capture gradient information that is invariant to geometric and photometric transformations and are thus particularly suited for human detection in images. Additionally, the false alarm mitigation support vector machine classifier stage 212 is trained using the positive class data and any false alarms that occur using only the previous three stages in the cascade (i.e., fast classifier stage 206, slow classifier stage 208, and false alarm mitigation classifier stage 210).

Following the false alarm mitigation support vector machine classifier stage 212, a window diversity test 216 is employed to further prune out any non-human-like regions. The window diversity test 216 essentially uses multiple analysis window heights and reflections to determine if the classifier response still indicates the presence of a human. From empirical observations, it has been noted that unlike human-like regions, typical false alarms do not respond at multiple window heights and, hence, can be suppressed. In addition, mirror reflections of humans should still be recognized as humans, whereas the reflection of a false alarm window is often not a false alarm.

Figure 3:
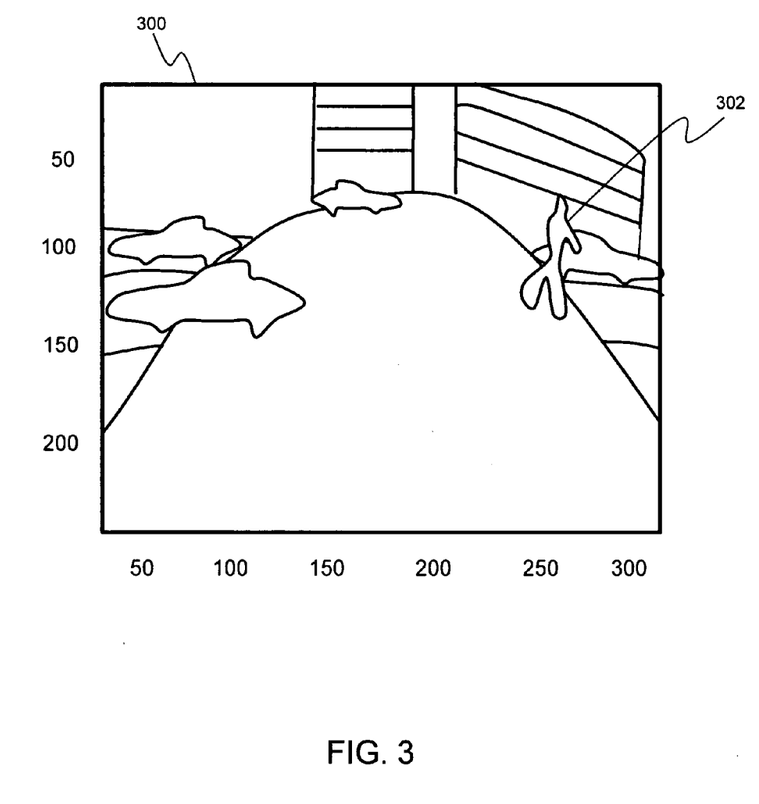
FIG. 3 is an illustration of an image to be processed for human detection according to the present invention.
Figure 4:
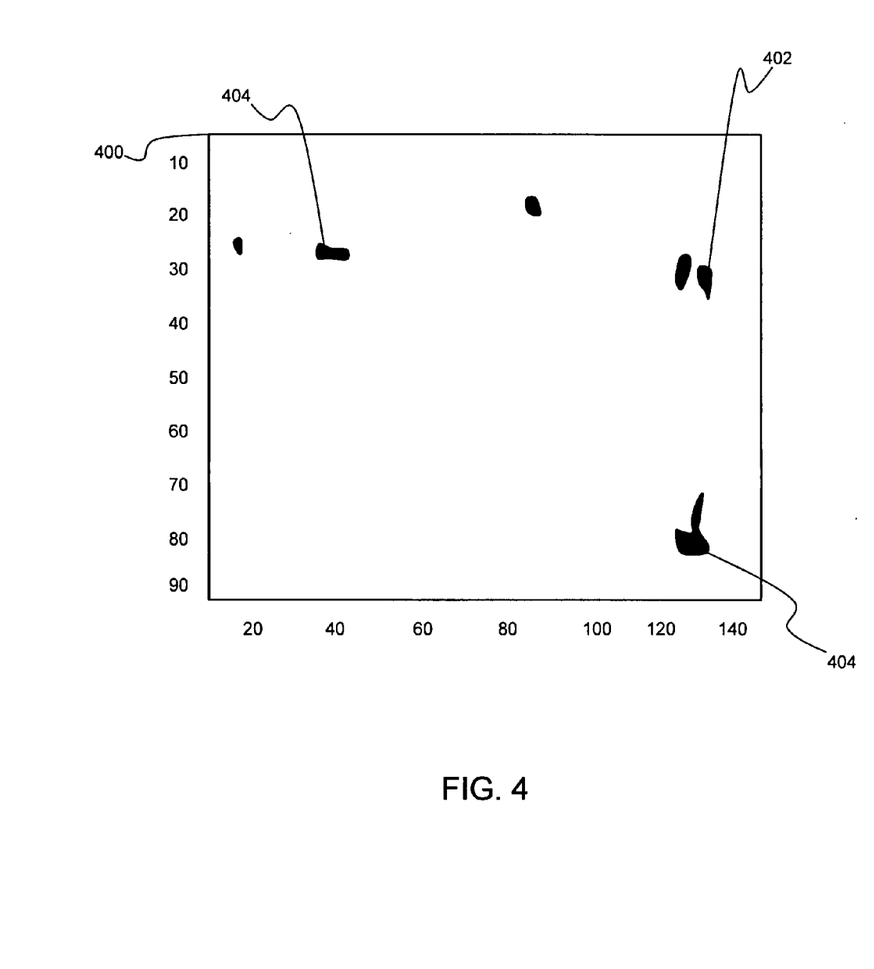
FIG. 4 is an illustration depicting a saliency map displaying false alarms along with a detected human according to the present invention.
Figure 5:
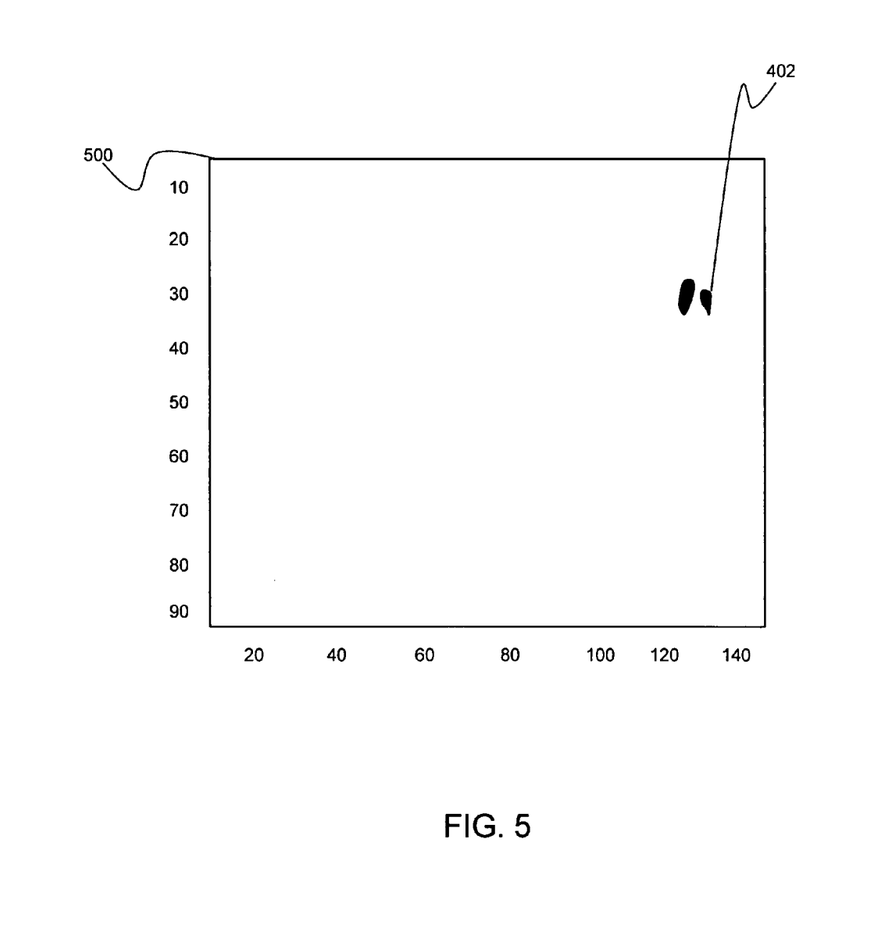
FIG. 5 is an illustration depicting a saliency map displaying only the detected human after suppression of the false alarms according to the present invention.

The last stage in the proposed cascade is a k-nearest neighbor stage 218 that stores a feature vector from the false alarm regions in the image and uses the stored feature information to reject any persistent false alarms. The described classifier cascade for human detection has been successfully tested across a wide variety of imagery and conditions. FIGS. 3-5 illustrate results obtained from using the k-nearest neighbor stage for suppressing false alarms. FIG. 3 is an illustration representative of an image 300 which depicts a human 302. FIG. 4 is an illustration of a saliency map 400 of the processed image 300 that shows the detected human 402 as well as some human-like regions 404, which represent false alarms. The illustrated saliency map is a map that shows the response of the classifier at each location in the input image. The persistent false alarms are memorized in the selected feature space, and the nearest neighbors stage then rejects the persistent false alarms. As shown in FIG. 5, the illustrated saliency map 500 depicts only the detected human 402, since the false alarms were suppressed using the nearest neighbors stage.

Figure 6:
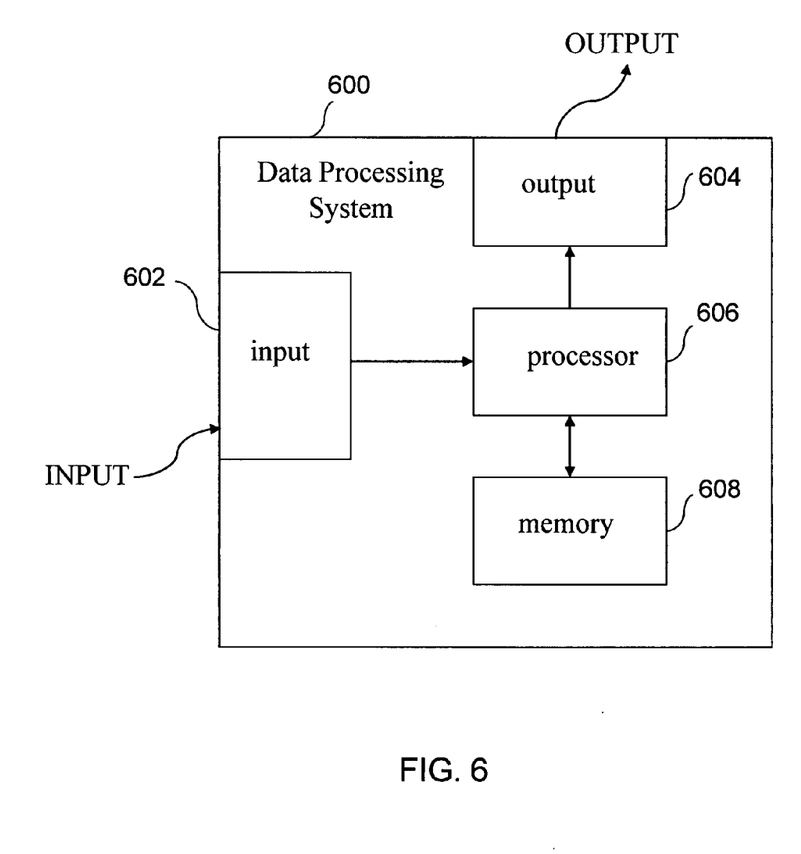
FIG. 6 is an illustration of a data processing system according to the present invention.

FIG. 6 illustrates a block diagram depicting components of a data processing system 600 (e.g., computer) incorporating the operations of the method described above. The method utilizes a data processing system 600 for storing computer executable instructions for causing a processor to carry out the operations of the above described method. The data processing system 600 comprises an input 602 for receiving information from a user. Information received may include input from devices such as cameras, scanners, keypads, keyboards, microphone, other peripherals such as storage devices, other programs, etc. The input 602 may include multiple "ports." An output 604 is connected with a processor 606 for providing information for transmission to other data processing systems, to storage devices, to display devices such as monitors, to generating information necessary for delivery, and to other mechanisms for presentation in user-usable forms. The input 602 and the output 604 are both coupled with the processor 606, which may be a general-purpose computer processor or a specialized processor designed specifically for use with the present invention. The processor 606 is coupled with a memory 608 to permit storage of data and software to be manipulated by commands to the processor 606.

Figure 7:
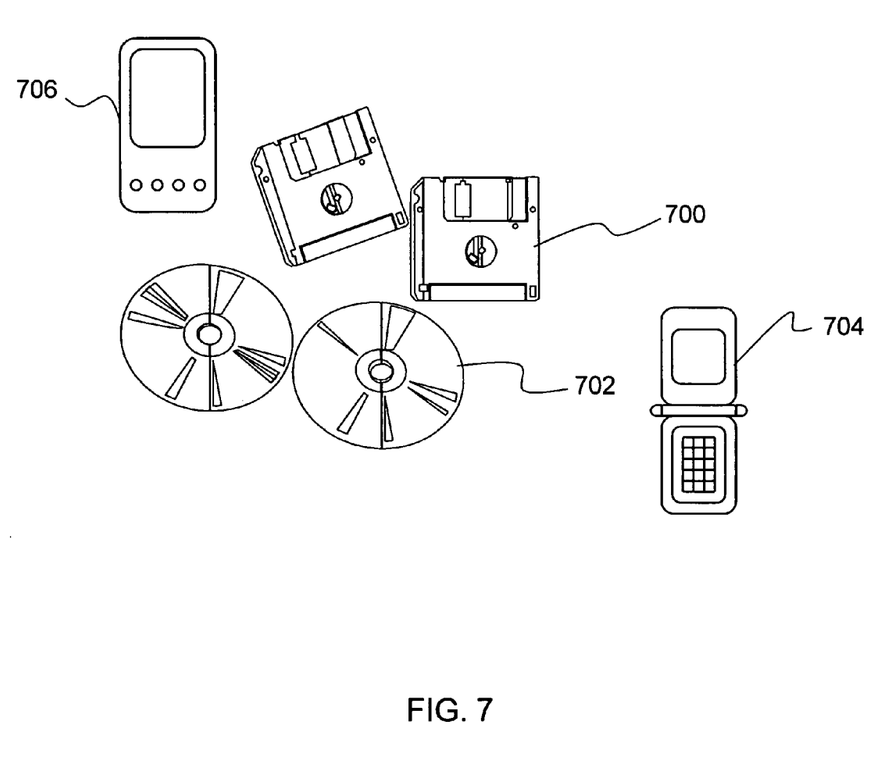
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code stored on any compatible computer readable medium. For instance, the computer program product may exist in the memory of a hand-held device such as a cell phone 704 or personal digital assistant (PDA) 706. The computer program product may be added to the cell phone 704 or PDA 706 by the manufacturer or user.

What is claimed is:

1. A system for visual object recognition, the system comprising one or more processors that are operable for performing operations of:

extracting a set of heterogeneous and complementary features from an analysis window, wherein the analysis window is a subregion of an input image;

training a cascade of heterogeneous classifiers with the extracted set of heterogeneous and complementary features, the cascade of heterogeneous classifiers comprising a plurality of specialized stages configured to perform specific tasks, such that each specialized stage in the cascade consists of a distinct classifier type;

wherein the plurality of specialized stages comprises:
      a fast classifier stage;

a slow classifier stage following the fast classifier stage;
a false alarm mitigation classifier stage following the slow classifier stage;
a false alarm support vector machine stage following the false alarm mitigation classifier stage;
and a k-nearest neighbor stage following the false alarm support vector machine stage; and
presenting an object of interest in the input image as extracted from the input image.

2. The system for visual object recognition as set forth in claim 1, wherein the plurality of specialized stages are trained with a set of data specific to the task to be performed, wherein each specialized stage is trained separately with a distinct set of data in order to bias each specialized stage independently.

3. The system for visual object recognition as set forth in claim 2, wherein at least one of the plurality of specialized stages is trained to be biased toward an object-like region and reject a plurality of non-object-like regions in the input image.

4. The system for visual object recognition as set forth in claim 3, wherein at least one of the plurality of specialized stages is Configured to mitigate false alarms, such that the specialized stage configured to mitigate false alarms is further trained using, at least one instance of a known false alarm collected when at least one previous specialized stage in the cascade was run on an input image that contained non-object-like regions.

5. The system for visual object recognition as set forth in claim 4, wherein the k-nearest neighbor stage is configured to further minimize residual false alarms that persist, wherein the k-nearest neighbor stage uses a set of stored feature information from at least one false alarm region in the input image to reject any residual false alarms.

6. A computer-implemented method for visual object recognition, the method comprising an act of causing a processor to perform operations of:
extracting a set of heterogeneous and complementary features from an analysis window wherein the analysis window is a subregion of an input image;
training a cascade of heterogeneous classifiers with the extracted set of heterogeneous and complementary features, the cascade of heterogeneous classifiers comprising a plurality of specialized stages configured to perform specific tasks, such that each specialized stage in the cascade consists of a distinct classifier type;
wherein the plurality of specialized stages comprises:
a fast classifier stage;
a slow classifier stage following the first classifier stage;
a false alarm mitigation classifier stage following the slow classifier stage;
a false alarm support vector machine stage following the false alarm mitigation classifier stage;
and a k-nearest neighbor stage following the false alarm support vector machine stage;
presenting an object of interest in the input image as extracted from the input image.

7. The method tier visual object recognition as set forth in claim 6, wherein the plurality of specialized stages are trained with a set of data specific to the task to be performed, wherein each specialized stage is trained separately with a distinct set of data in order to bias each specialized stage independently.

8. The method for visual object recognition as set forth in claim 7, wherein at least one of the plurality of specialized stages is trained to be biased toward an object-like region and reject a plurality of non-object-like regions in the input image.

9. The method for visual object recognition as set forth in claim 8, wherein at least one of the plurality of specialized stages is configured to mitigate false alarms, such that the specialized stage configured to mitigate false alarms is further trained using at least one instance of a known false alarm collected when at least one previous specialized stage in the cascade was run on an input image that contained non-object-like regions.

10. The method for visual object recognition as set forth in claim 9, wherein the k-nearest neighbor stage is configured to further minimize residual false alarms that persist, wherein the k-nearest neighbor stage uses a set of stored feature information from at least one false alarm region in the input image to reject any residual false alarms.

11. A computer program product for visual object recognition, the computer program product comprising computer-readable instruction means stored on a non-transitory computer-readable medium that are executable by a computer having a processor for causing the processor to perform operations of:
extracting a set of heterogeneous and complementary features from an analysis window, wherein the analysis window is a subregion of an input image;
training a cascade of heterogeneous classifiers with the extracted set of heterogeneous and complementary features, the cascade of heterogeneous classifiers comprising a plurality of specialized stages configured to perform specific tasks, such that each specialized stage in the cascade consists of a distinct classifier type;
wherein the plurality of specialized stages comprises:
a fast classifier stage;
a slow classifier stage following the fast classifier stage;
a false alarm mitigation classifier stage following the slow classifier stage;
a false alarm support vector machine stage following the false alarm mitigation machine stage;
presenting an object of interest in the input image as extracted from the input image.

12. Computer program product for visual object recognition as set forth in claim 11, wherein the plurality of specialized stages are trained with a set of data specific to the task to be performed, wherein each specialized stage is trained separately with a distinct set of data in order to bias each specialized stage independently.

13. Computer program product for visual object recognition as set forth in claim 12, wherein at least one of the plurality of specialized stages is trained to be biased toward an object-like region and reject a plurality of non-object-like regions in the input image.

14. The computer program product for visual object recognition as set forth in claim 13, wherein at least one of the plurality of specialized stages is configured to mitigate false alarms, such that the specialized stage configured to mitigate false alarms is further trained using at least one instance of a known false alarm collected when at least one previous specialized stage in the cascade was run on an input image that contained non-object-like regions.

15. The computer program product for visual object recognition as set forth in claim 14, wherein the k-nearest neighbor stage is configured to further minimize residual false alarms that persist, wherein the k-nearest neighbor stage uses a set of stored feature information from at least one false alarm region in the input region to reject any residual false alarms.

* * * * *